April 12, 1960　　E. G. NOYES, JR., ET AL　　2,932,306
REGULATOR FOR A PRIME MOVER UTILIZING AN ELASTIC MOTIVE FLUID
Filed June 10, 1958
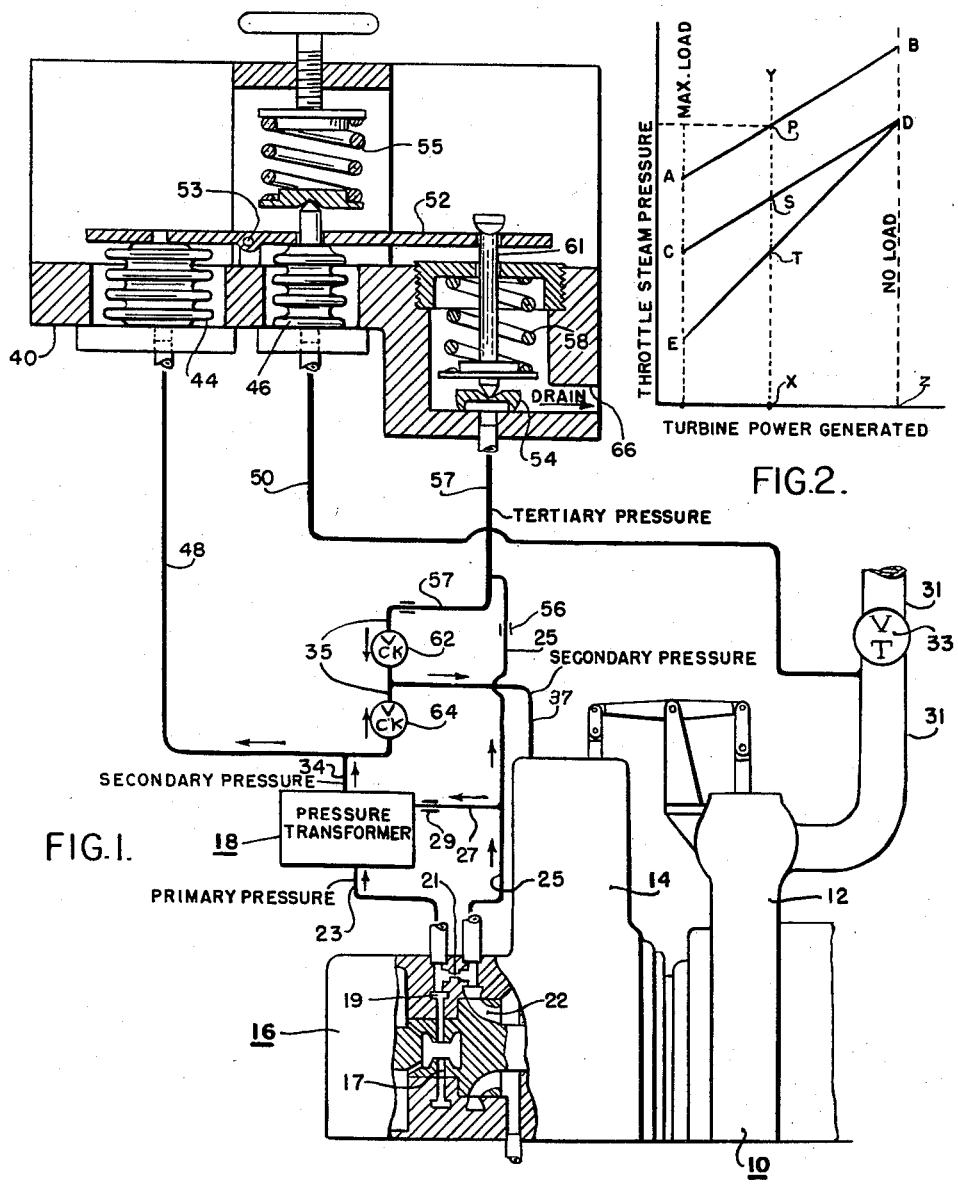
INVENTORS
EDWIN G. NOYES JR.
OZRO N. BRYANT

United States Patent Office 2,932,306
Patented Apr. 12, 1960

2,932,306

REGULATOR FOR A PRIME MOVER UTILIZING AN ELASTIC MOTIVE FLUID

Edwin G. Noyes, Jr., and Ozro N. Bryant, Chester, Pa., assignors to Westinghouse Electric Corporation, East Pittsburgh, Pa., a corporation of Pennsylvania Application June 10, 1958, Serial No. 741,053

5 Claims. (Cl. 137—29)

This invention relates to a regulator for a prime mover utilizing an elastic fluid and more particularly to a regulator that will automatically tend to open or close the admission valves of the prime mover in accordance with the fluid pressure and the power that the prime mover is generating.

In steam turbine power plants where a single steam generator supplies the entire steam demand of the turbine, there is a possibility that something may go wrong with the steam generator suddenly and without warning to the operator, resulting in a sudden drop in steam generator pressure while the turbine attempts to generate power at a constant value.

Upon this sudden drop in pressure, it is desirable to reduce automatically and promptly the amount of power being generated by the turbine, by partially or completely closing the admission valves. This prevents the steam generator pressure from further falling to the level where there is a sudden evaporation of the water and a possibility of a carry-over of water into the hot turbine. The foregoing would otherwise take place in an attempt to supply the larger quantity of steam, at the reduced steam pressure, which would be necessary to maintain the same rate of power generation previously existing. If such a carry-over of water into the hot turbine should take place, there is a possibility of substantial damage to the various parts of the turbine. It is an object of the present invention to provide an improved regulator for reducing the amount of steam supplied to the turbine upon a sudden decrease in generator steam pressure and thereby reduce the power output of the turbine to a value which it can safely generate.

When the difficulty which initially gives rise to the drop in steam pressure has cleared, it is desirable for the regulator to permit the steam admission valves to move in opening direction, allowing the turbine to generate more power. Therefore, it is a further object to provide a regulator that will automatically permit the admission valves to move in opening direction upon an increase in steam pressure.

In some of the modern steam generators, for instance, the type of steam generator in which the heat for vaporization is supplied by fossil fuels such as coal and gas, the steam generator pressure may be kept substantially constant, regardless of the power output of the turbine, by varying the firing rate of the fuel directly with turbine power output. However, with other modern steam generators, for example, the type in which the heat for vaporization is supplied by a nuclear reactor, the steam generator pressure decreases as the quantity of steam produced by the steam generator or the power output of the turbine is increased. Since the steam pressure at the steam generator varies with the power output of the turbine, the regulator for use with such a steam generator must be responsive to both the steam throttle pressure and the power output of the turbine. It is another object of the present invention to provide a regulator for controlling the steam admisison valves of a steam turbine in response to the correlated values of the steam pressure and the power output of the turbine.

The present invention, although not limited thereto, is highly advantageous for controlling a steam turbine utilized in conjunction with a steam generator having as its heat source a nuclear reactor. The turbine is provided with a governor for producing a primary liquid pressure proportional to the speed of rotation of the turbine, as disclosed in the patents to Bryant 2,035,689 and to the Schmidt 2,256,693 assigned to the assignee of the present invention. The primary liquid is supplied to a transformer where a secondary liquid at a higher pressure is proportioned in relation to the primary liquid, as is well known and illustrated by the patent to A.F. Schwendner 2,548,072, also assigned to the assignee of the present invention.

A hydraulic servo-motor relay device, responsive to the control signal, controls the admission valves to regulate the steam flow to the turbine.

During normal operation, when the throttle steam pressure is at the level required by the power output of the turbine or above a predetermined minimum, the secondary liquid supplies the control signal to the servo-motor relay device.

However, in addition to being supplied to the servo-motor relay device at certain times, the secondary liquid is supplied at all times to a regulator constructed in accordance with the present invention.

The conduit supplying steam from the steam generator to the admission valves is provided with a throttle valve upstream of the admission valves. The throttle steam pressure is substantially the same as the steam generator outlet pressure and is supplied to the regulator. Hence, the regulator will hereinafter be called a throttle pressure regulator.

The throttle pressure regulator comprises a pivotable arm to which are secured a first movable abutment subject to the secondary liquid pressure and a second movable abutment subject to the throttle steam pressure. These abutments act in opposition to each other and control a regulating valve which determines the pressure of a tertiary liquid. Thus, the pressure of the tertiary liquid is correlated to the power output of the turbine and to the throttle steam pressure.

The secondary liquid and the tertiary liquid are automatically and selectively supplied to the servomotor relay device through suitable check valves which allow the liquid at the higher pressure to enter and control the servo-motor relay device.

Normally, the secondary liquid pressure is higher than the tertiary liquid pressure; hence the secondary liquid will flow into and control the servo-motor relay device. However, when the relation between the steam pressure and the secondary liquid pressure (or power generated) is such that the pressure of the tertiary liquid is raised by the regulating valve above that of the secondary liquid, the check valves will operate to allow the tertiary liquid to flow into and control the servo-motor relay device and to tend to close the admission valves.

The foregoing and other objects are effected by the invention as will be apparent from the following description and claims taken in connection with the accompanying drawings, forming a part of this application, in which:

Fig. 1 is a diagrammatic representation of a portion of a typical steam turbine, partly in section, in conjunction with a throttle pressure regulator formed in accordance with the present invention; and Fig. 2 is a graph illustrating various characteristics of the steam turbine and of the throttle pressure regulator.

A steam turbine 10 is illustrated having steam admission valves 12 and a pressure-responsive servo-motor relay device 14 for regulating the valves, these elements being shown in elevation, since they may be of suitable well-known types.

The turbine 10 is further provided with a speed governor 16, such as disclosed in the aforementioned patents to Bryant 2,035,689 and to Schmidt 2,256,693, comprising a reverse flow impeller 17, cooperating with a control mechanism or transformer 18 of a suitable type, such as disclosed in the aforementioned patent to A. F. Schwendner 2,548,072, to provide a hydraulic control signal to the servo-motor relay device 14 for regulating the admission of steam to the turbine by the admission valves 12. In the embodiment shown, the servo-motor relay device may be of the type shown in the patent to A. F. Schwendner 2,224,321.

The governor 16 includes a passage 19 which is supplied with liquid at a high pressure through an orifice 21 from a suitable pressurizing source, such as the turbine driven impeller 22. The pressure in the passage 19, hereinafter termed the primary liquid pressure, is varied by means of the centrifugal resistance to escape of liquid afforded by the reverse flow impeller 17. Hence, the primary liquid pressure increases with increasing speed and vice versa, the pressure varying substantially as the square of the speed of the turbine.

The primary liquid pressure is supplied from the passage 19 to the control 18 by a conduit 23. The control 18 operates to vary the pressure of a secondary liquid at a substantially higher value than the primary liquid, in proportion to the change in primary liquid pressure in the passageway 19 and the conduit 23. Since the speed will decrease or increase with addition or decrease, respectively, in load on the turbine, the secondary liquid pressure, like the primary liquid pressure, is proportioned to and is an indication of the power that the turbine is attempting to generate, but is maintained at a higher pressure level. The secondary liquid may be supplied to the control 18 from a suitable pressurizing source, such as the impeller 22, by conduits 25 and 27, the latter including an orifice 29.

In some of the modern steam generators, for instance the type of steam generator in which the heat source is supplied by a nuclear reactor, the steam generator pressure decreases as the quantity of steam produced by the steam generator or the power generated by the turbine, is increased, as illustrated by the inclined line AB in Fig. 2. Stated another way, the steam generator pressure decreases as the demand upon the steam generator or the power output of the turbine is increased. Under steady state or normal conditions, the pressure of the steam supplied to the turbine through a conduit 31 and a throttle valve 33 is within a fixed limit, for a given power generation, of the value indicated by the line AB in Fig. 2, and the position of the admission valves 12 is such as to allow the required amount of steam to flow into the turbine. At such times, the control signal to the servo-motor relay device 14 is supplied by the secondary liquid from the control 18 through a conduit 34, a manifold 35, described in detail subsequently, and a conduit 37. Thus, during steady state or normal conditions, the control 18 determines the position of the admission valves.

For example, when the turbine power output is equal to X, the normal pressure on the constant power output line XY is P. If, for any reason, the steam pressure falls below P the admission valves will remain under the control of the control 18 until the pressure drops to the level S on the inclined line CD. That is, between the pressure levels P and S the admission valves will tend to open as the pressure drops to supply the increased quantity of steam required at the lower pressure to maintain the pre-existing power output of the turbine.

However, if for any reason, the steam pressure falls below the level S, it is essential to insure that the admission valves are moved toward the closed position upon such drop in pressure, and completely closed in the event that the pressure falls to the value T, on the line ED, thereby shutting down the turbine. It will be noted that the line ED has a greater slope than the lower operating limit line CD and intersects it at the point D, corresponding to the no load value Z. Hence a greater drop in steam pressure may be tolerated, when the normal power output of the turbine is increased, before completely closing the admission valves.

In accordance with the invention, a throttle pressure regulator 40 is provided for controlling the admission valves 12 when the steam pressure falls below the line CD for any selected turbine power output.

The regulator 40 comprises two movable abutments or bellows 44 and 46 supplied with secondary liquid pressure through a conduit 48 connected to the conduit 34 and steam pressure through a conduit 50 connected to the steam supply conduit 31, respectively, the conduit 50 being connected to the conduit 31 immediately downstream of the throttle valve 33. The bellows 44 and 46 operate in opposition to each other and are connected to an arm 52, pivotally supported at 53, for regulating the pressure of a tertiary liquid through a regulating or cup valve 54 that is also connected to the arm 52. Since the steam pressure is much larger than the secondary liquid pressure, an adjustable spring 55 may be provided for opposing the bellows 46 and making possible convenient proportions for the bellows 44 and 46. Tertiary liquid may be supplied to the cup valve 54 by the conduit 25, through an orifice 56 located upstream of the orifice 29 and a conduit 57. The conduit 57 is connected to the manifold 35 and supplies tertiary liquid thereto for the hereinafter described purpose.

The cup valve 54 is biased in closing direction by an adjustable spring 58, against the pressure of the tertiary liquid. The cup valve 54 and the arm 52 are connected to each other by a headed rod 61 so as to permit slidable movement of the arm downward relative to the rod 61 but limited upward slidable movement of the arm 52 with respect to the rod 61. By properly setting the compression of this spring, varying quantities of liquid are allowed to drain through the conduit 66 as the cup valve is lifted by the arm 52.

The bellows 44 and 46, the cup valve 54, the springs 55 and 58 and the arm 52 are proportioned and arranged so that the tertiary liquid pressure is lower than the secondary liquid pressure for a decrease in throttle steam pressure within the range indicated by the lines AB and CD in the chart. Further, the foregoing mentioned members are arranged and proportioned so that as the throttle steam pressure progressively decreases below the fixed limit of line CD for a given power output, the tertiary liquid pressure will progressively become higher than the secondary liquid pressure. As it becomes greater than the secondary liquid pressure, the tertiary liquid pressure is supplied to the servo-motor relay device to move the admission valves in the closing direction and, as the tertiary liquid pressure continues to rise, upon continued decrease in steam pressure, the admission valves continue to close until at the steam pressure indicated by the line ED in Fig. 2, they are moved to the fully closed position.

So long as the throttle steam pressure remains within the normal operating range, the opposed forces due to the bellows 44 and 46 maintain the cup valve in partially open position, resulting in a tertiary liquid pressure equal to or below that of the secondary liquid pressure. When the steam pressure drops, the bellows 44 overcomes the opposing pressure of bellows 46 and moves upwardly, rotating the arm 52 clockwise. The arm 52 frees the cup valve 54 tending to close the same under the bias of the spring 58 and increasing the pressure of the tertiary liquid. For small decreases in steam pressure no significant increase in tertiary pressure will take place, but if the decrease in throttle steam pressure continues below the fixed limit indicated by the line CD in Fig. 2, the tertiary liquid pressure will become greater until it rises above the secondary liquid pressure.

As stated, the conduit 57 supplies the tertiary liquid to the manifold 35 that includes check valves 62 and 64. In normal operation, when the secondary liquid pressure is above that of the tertiary liquid, the check valve 62 is closed and the check valve 64 is open, allowing secondary liquid to flow through the manifold 35 and the conduit 37 to the servo-motor relay device 14. During abnormal conditions, when the throttle steam pressure decreases to the level such that the tertiary liquid pressure rises above the secondary liquid pressure, the check valve 62 opens and the check valve 64 closes, allowing tertiary liquid flow through the conduit 57, the manifold 35 and the conduit 37 into the servo-motor relay device 14.

Thus, the various members may be arranged so that, when for any given power output of the turbine the throttle steam pressure drops below the line CD, the admission valves will start to close because the tertiary liquid actuates the servo-motor relay device in the closing direction. If the throttle steam pressure continues to decrease, the admission valves will continue to close because the tertiary liquid pressure continues to rise. On the other hand when the steam pressure rises, after the admission valves have been partially or completely closed, the increase in steam pressure will move the arm 52 in a counterclockwise direction, lifting the cup valve against the bias of the spring 58 and reducing the pressure of the tertiary liquid. As the tertiary liquid pressure decreases, the servo-motor relay device will be actuated in the opening direction and eventually, as the steam pressure further increases, the tertiary liquid pressure will be reduced below that of the secondary liquid pressure and at that point normal operation will be resumed automatically.

From the foregoing it is seen that a throttle pressure regulator has been provided that correlates the power output of the turbine with the throttle pressure of the steam being supplied to the turbine. When the steam pressure and power output of the turbine are at the predetermined relationship a control regulates the admission valves. If for any reason, this predetermined relationship between the steam pressure and the power output of the turbine is disturbed, usually by the fall of steam pressure while the turbine attempts to continue its power output existing before the steam pressure drop, the throttle pressure regulator overrides the control and tends to close the admission valve, upon a sufficient drop in steam pressure, to prevent damage to the turbine.

It will further be seen that the invention provides a throttle pressure regulator which controls a servo-motor relay device during periods of emergency by overriding the control signal normally supplied to the servo-motor relay device by the speed governor.

While the invention has been shown in but one form, it will be obvious to those skilled in the art that it is not so limited, but is susceptible of various changes and modifications without departing from the spirit thereof.

What is claimed is:

1. The combination with elastic motive fluid utilizing apparatus in which the pressure of the motive fluid supply varies inversely with the power generated, said elastic motive fluid utilizing apparatus having a fluid admission valve, pressure responsive means regulated by a control signal for controlling said valve, means for pressurizing a first liquid at a pressure varying as a function of the speed and power generation of said fluid utilizing apparatus; a control for pressurizing a second liquid at a pressure correlated to the pressure of said elastic motive fluid and the power generation of said fluid utilizing apparatus, said control comprising a first movable abutment subject to the first liquid pressure, a second movable abutment subject to the elastic motive fluid pressure, the first and second abutments being connected to each other and acting in opposition to each other, a regulating valve controlled by the first and second abutments, the motive fluid pressure acting in a direction to open said regulating valve, said regulating valve varying the pressure of said second liquid, and conduit means for selectively supplying said first liquid or said second liquid, whichever is at the higher pressure, to said pressure responsive device.

2. The combination with elastic motive fluid utilizing apparatus wherein with an increase in the power generated the pressure of the motive fluid supply decreases, said elastic motive fluid utilizing apparatus having a fluid admission valve, pressure responsive means for controlling said valve, means for pressurizing a primary liquid at a pressure varying as a function of the speed and power generation of said fluid utilizing apparatus for controlling said pressure responsive means, and a control for pressurizing a second liquid at a pressure correlated to the pressure of said elastic motive fluid and the power generation of said fluid utilizing apparatus, said control comprising a movable arm, a first movable abutment connected to said arm and subject to the primary liquid pressure, a second movable abutment connected to said arm and subject to the elastic motive fluid pressure, the first and second abutments tending to move said arm in opposite directions, a regulating valve connected to said arm and controlled by the first and second abutments, the motive fluid pressure acting in a direction to open said regulating valve, said regulating valve being effective to vary the pressure of said secondary liquid, and means including check valves for automatically and selectively supplying said primary liquid or said secondary liquid, whichever is at the higher pressure, to said pressure responsive device, whereby the latter is selectively operated by said primary liquid or said secondary liquid.

3. The combination with a prime mover driven by elastic motive fluid wherein the pressure of the motive fluid supply varies with the power generated, said prime mover having a fluid admission valve, pressure responsive means actuated by a control signal for controlling said valve, said pressure responsive device being movable in one direction upon an increase in pressure of the control signal and in the opposite direction upon a decrease in such pressure, thereby to regulate flow of motive fluid through said admission valve, means for pressurizing a primary liquid at a pressure varying as a function of the speed and power generation of said prime mover for controlling said pressure responsive device, of a control for pressurizing a secondary liquid at a pressure correlated to the pressure of said elastic motive fluid and the power generation of said fluid utilizing apparatus corresponding to the pressure of the elastic motive fluid as indicated by said primary liquid pressure, said control comprising a movable arm, a first bellows connected to said arm and subject to the pressure of said secondary liquid, a second bellows connected to said arm and subject to the pressure of the elastic motive fluid, said first and second bellows acting in opposition to each other, a regulating valve connected to said arm and controlled by the first and second bellows, the motive fluid pressure acting in a direction to open said regulating valve, said regulating valve being effective to vary the pressure of said secondary liquid, means including check valves for selectively supplying said primary liquid or said secondary liquid, whichever is at the higher pressure, to said pressure responsive device, whereby the latter is automatically and selectively operated by said primary liquid or said secondary liquid pressures to position said admission valve.

4. In combination with a steam turbine supplied with steam at a decreasing pressure as the power generated by the turbine increases, said steam turbine having a steam admission valve, a servomotor relay device regulated by a liquid pressure control signal for controlling said valve, said servomotor relay device being effective to close the admission valve upon an increase in pressure of the control signal and to open the admission valve upon a decrease in pressure of the control signal, means for pressurizing a primary liquid at a pressure varying as a function of the speed and power generation of the turbine for controlling said servo-motro relay device and a control comprising a regulating valve for pressurizing a secondary liquid at a pressure correlated to the pressure of the steam supplied to said turbine and the power which the turbine is attempting to generate at that time, said control comprising a pivotable arm operatively associated with said regulating valve and movable in one direction to open said valve and in the other direction to permit closure of said valve, a first movable abutment connected to said arm and subject to the pressure of said primary liquid, a second movable abutment connected to said arm and subject to said steam pressure, said first abutment urging said arm in said one direction with rise in steam pressure and permitting movement of said arm in said other direction with fall in steam pressure, said second abutment acting in opposition to said first abutment, a regulating valve connected to said arm and regulated by the first and second abutments, and means including a conduit for selectively supplying said primary liquid or said secondary liquid, whichever is at a higher pressure, to said servo-motor relay device.

5. In combination with a steam turbine supplied with steam at a decreasing pressure as the power generated by the turbine or the turbine demand for steam increases, said steam turbine having a steam admission valve, a servo-motor relay device regulated by a liquid pressure control signal for controlling said valve, said servo-motor relay device being effective to close the admission valve upon an increase in pressure of the control signal and to open the admission valve upon a decrease in pressure of the control signal, means for pressurizing a primary liquid at a pressure varying as a function of the speed and power generation or amount of steam required by the turbine, a first control for pressurizing a secondary liquid at a higher pressure proportional to the primary liquid pressure for controlling said servo-motor relay device, and a second control for pressurizing a tertiary liquid at a pressure correlated to the pressure of the steam supplied to said steam turbine and the power which the turbine is attempting to generate at that time as indicated by the secondary liquid pressure, said second control comprising a pivotable arm, a first expansible bellows operatively associated with said arm and subject to the pressure of said secondary liquid, a second expansible bellows operatively associated with said arm and subject to the steam pressure, said first and second bellows acting in opposition to each other, a cup valve connected to said arm, means for biasing said valve in closing direction, said first bellows urging said arm in valve closing direction upon expansion and said second bellows urging said arm in valve opening direction upon expansion, said cup valve being controlled by the first and second bellows for varying the tertiary liquid pressure in accordance with changes in secondary liquid pressure and steam pressure, and manifold conduit means including check valves for automatically and selectively supplying said secondary liquid or said tertiary liquid, whichever is at a higher pressure valve, to said servo-motor relay device.

References Cited in the file of this patent

UNITED STATES PATENTS 2,345,297  Schwendner _____ Mar. 28, 1944

FOREIGN PATENTS 750,343  Great Britain _____ June 13, 1956

UNITED STATES PATENT OFFICE

CERTIFICATE OF CORRECTION

Patent No. 2,932,306                                 April 12, 1960

Edwin G. Noyes, Jr., et al.

It is hereby certified that error appears in the printed specification of the above numbered patent requiring correction and that the said Letters Patent should read as corrected below.

Column 6, line 6, for "repsonsive" read -- responsive --; line 16, for "second" read -- secondary --; column 7, line 3, for "servo-motro" read -- servo-motor --; same line 3, after "device" insert a comma; column 8, line 25, for "valve" read -- value --.

Signed and sealed this 20th day of September 1960.

(SEAL)
Attest:

KARL H. AXLINE
Attesting Officer

ROBERT C. WATSON
Commissioner of Patents